United States Patent [19]

Parsons

[11] Patent Number: 4,898,042
[45] Date of Patent: Feb. 6, 1990

[54] ROTARY DRIVES

[75] Inventor: Bryan N. V. Parsons, Stoney Stanton, England

[73] Assignee: Jaguar Cars Limited, United Kingdom

[21] Appl. No.: 230,786

[22] Filed: Aug. 10, 1988

[30] Foreign Application Priority Data

Aug. 29, 1987 [GB] United Kingdom ............... 8720494

[51] Int. Cl.⁴ ..................... F16H 21/12; F01L 7/00
[52] U.S. Cl. ................................. 74/68; 74/393; 123/190 BD; 137/624.13
[58] Field of Search ............... 74/68, 393; 137/624.13, 137/624.15; 123/80 D, 190 BD

[56] References Cited

U.S. PATENT DOCUMENTS

| 511,924 | 1/1894 | Barrett | 74/68 |
| 1,134,961 | 4/1915 | Richards | 74/68 |
| 1,971,885 | 8/1934 | Viale | 74/68 |
| 2,416,573 | 2/1947 | Finch | 74/68 |

Primary Examiner—Leslie A. Braun
Assistant Examiner—Janice E. Chartoff
Attorney, Agent, or Firm—Davis, Bujold and Streck

[57] ABSTRACT

A rotary drive mechanism has an input shaft with a first crank, mounted parallel to an output shaft, the input shaft being offset from the output shaft by a distance equal to the length of the first crank, the output shaft having a second crank of greater length than the first crank, the first and second cranks are pivotally connected to opposite ends of a link, interlocking formations are provided to prevent rotation of the second crank and link independently of the input shaft when the second crank and link are parallel to one another.

14 Claims, 6 Drawing Sheets

ROTARY DRIVES

BACKGROUND TO THE INVENTION

The present invention relates to a rotary drive and in particular to a rotary drive suitable for use with rotary valve mechanisms in which a intermittent drive is desirable.

It has been proposed hitherto to use rotary valves for internal combustion engines, but in order to seal the rotating valve member on the high pressure (i.e. compression and combustion) strokes of the engine, complex gas seals have been required. Furthermore, such systems result in high frictional loads with consequent reduction in efficiency and high wear rates. In order to reduce the problems of high frictional loads, it has been proposed to reduce the speed of rotation of the valves on the high pressure strokes of the engine, using a differential drive gear arrangement. Such systems are however relatively complex and the space required for the differential drive gear arrangement will substantially increase the overall height of the engine.

The present invention provides a rotary drive of relatively simple construction, which will significantly reduce the speed of rotation of a rotary valve during high pressure strokes of the engine.

SUMMARY OF THE INVENTION

According to one aspect of the invention, a rotary drive mechanism comprises an input shaft having a first crank, an output shaft mounted parallel to the input shaft but offset radially therefrom by distance equal to the length of the first crank, said output shaft having a second crank the length of which is greater than the length of said first crank, the first and second cranks being pivotally connected to opposite ends of a link, the link being the same length as the second crank, and interlock means being provided between the first crank and at least one of the second crank and link, to prevent rotation of the second crank and link independently of the input shaft, when the second crank and link are parallel to one another.

With the rotary drive disclosed above, two revolutions of the input shaft are required to rotate the output shaft by one revolution. Furthermore, a variable speed drive is provided.

The actual variation in rate at which the input shaft drives the output shaft depends on the difference in lengths of the first and second cranks. The smaller the difference in length, the greater the variation in speed of the output shaft. There is, however, a physical limitation to the speed differential that can be achieved as the system has to be able to provide the appropriate acceleration to the output shaft and components associated with the output shaft. With small differences in length between the first and second cranks, the acceleration required will be extremely high and for most applications will be impractical. Nevertheless, with the device disclosed above typically up to 95% of rotation of the output shaft corresponds to one rotation of the input shaft, while for 180° revolution of the input shaft, there will be very little movement of the output shaft.

This drive system is particularly suitable for rotary valve mechanisms, the drive being arranged so that the rotary valve is only driven slowly during the high pressure strokes of, for example, an internal combustion engine. This significantly reduces wear on the valve rotor and port seals. Furthermore, the two to one drive ratio is ideal for four stroke engines where the valves are opened once for every two cycles of the engine. Furthermore by rotating the valve rotor slowly while the ports are closed, the ports may be made larger and thus more efficient.

BRIEF DESCRIPTION OF THE DRAWINGS

An embodiment of the invention is now described, by way of example only, with reference to the accompanying drawings in which:

FIGS. 5A to 5H illustrate the sequential operation of the rotary valve illustrated in FIG. 4;

DESCRIPTION OF A PREFERRED EMBODIMENT

Figure 1:
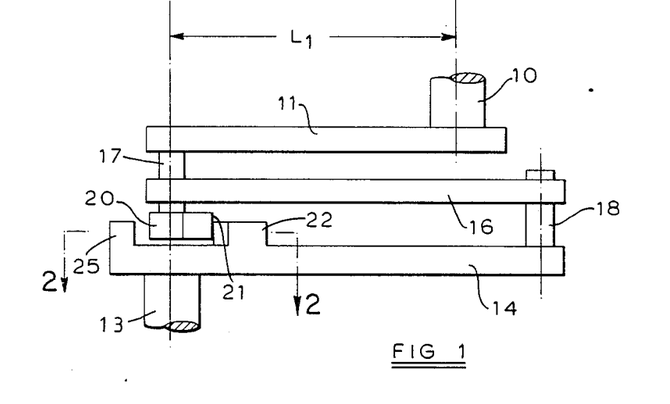
FIG. 1 is a side elevation illustrating a drive mechanism according to the present invention.

As shown in FIG. 1 a rotary drive comprises an input shaft 10 having a crank 11 mounted thereon for rotation therewith. An output shaft 13 is parallel to the input shaft 10 but offset radially therefrom by a distance equal to the length $L_1$ of the crank 11. A second crank 14 is mounted on output shaft 13 for rotation therewith. The two cranks 11 and 14 are pivotively connected to opposite ends of a link 16 by means of crank pins 17 and 18 respectively.

A formation 20 is non-rotatably mounted on the end of crank pin 17, so that it is located between the link 16 and crank 14. Said formation 20 has a flat face 21 which is transverse to the crank 11 and offset from the axis of the crank pin 17 towards the input shaft 10.

A first formation 22 is provided on the second crank 14 offset from the axis of the output shaft 13 towards crank pin 18. As better illustrated in FIG. 2, face 23 of the formation 22 is contoured to conform with the path of the face 21 of formation 20, as the crank 11, link 16 and crank 14 move together to the position illustrated in FIG. 1, so that in that position the contoured face 23 will abut the flat face 21 which will prevent crank 14 and link 16 pivotting about the aligned axes of the output shaft 13 and the crank pin 17.

A second formation 25 is provided on crank 14 on the opposite side of the axis of the output shaft 13 to formation 22. Formation 25 has a flat face 26 which is offset from the axis of the output shaft 13 by the same amount as the face 21 of formation 20 is offset from the axis of crank pin 17. As the input shaft 10 completes one revolution and link 16 and crank 14 move towards the position illustrated in FIG. 3, he face 26 will move into engagement with face 21 so that in the position illustrated in FIG. 3, the faces 21 and 26 will abut, again preventing rotation of the crank 14 and link 16 about the aligned axes of output shaft 13 and crank pin 17. Alternatively, the interlock means may be provided between the crank 11 and link 16 or the interlock for one position may be provided between crank 11 and link 16 while the interlock for the other position is between the crank 11 and the crank 13.

Figure 2:
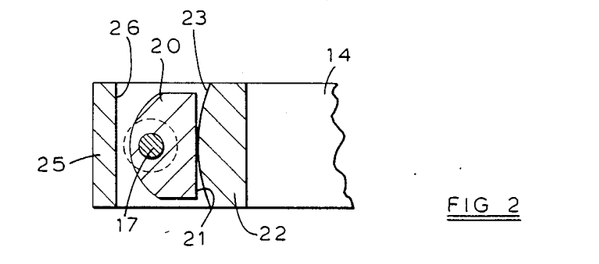
FIG. 2 a section along the line 2—2 in FIG. 1, illustrating the interlock means.
Figure 3:
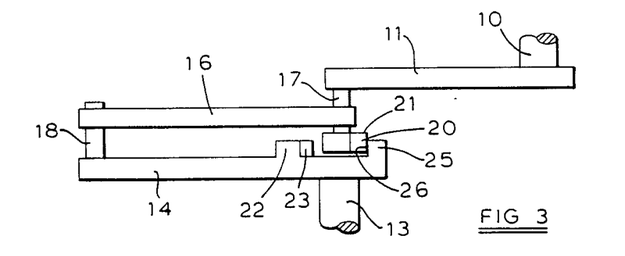
FIG. 3 is a view similar to FIG. 1 but with the input shaft rotated through one revolution.
Figure 4:
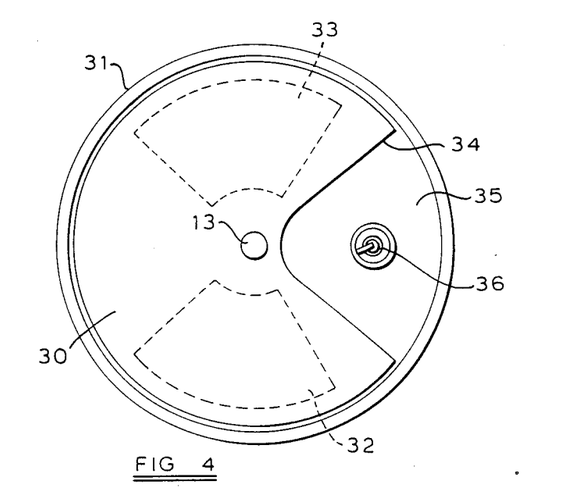
FIG. 4 illustrates in plan view from below, the cylinder head of an internal combustion engine incorporating a rotary valve driven by the mechanism illustrated in FIG. 1.

The drive mechanism illustrated in FIGS. 1 to 3 is suitable for use in driving the rotary valve of an internal combustion engine. As illustrated in FIG. 4, a valve disc 30 is mounted on the output shaft 13 which passes through the cylinder head 31. The disc 30 overlies an exhaust port 32 and an inlet port 33 in the cylinder head 31, a segment 34 of the disc 30 being removed so that as the disc 30 rotates it will open and close ports 32 and 33 in turn.

The exhaust and inlet ports 32 and 33 are positioned so that there is a space 35 therebetween which is greater than the segment 34 removed from disc 30. An ignition device 36 is located through the cylinder head in the portion thereof defined by space 36.

FIGS. 5A to 5H illustrate the movement of the valve disc 30 and the opening and closing of exhaust and inlet ports 32 and 33 as the input shaft 10 rotates through 90° steps.

Figure 5A:
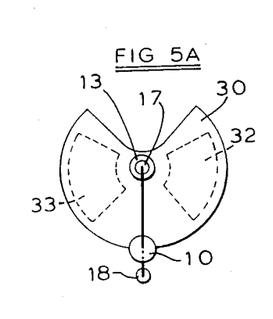
Figure 5B:
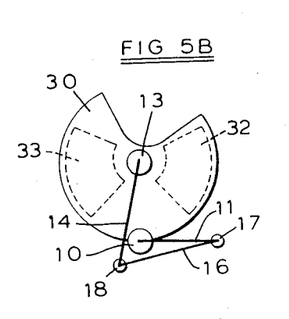
Figure 5C:
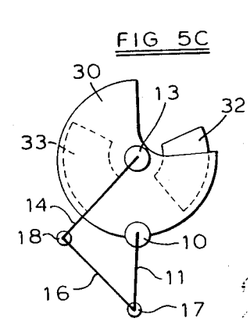
Figure 5D:
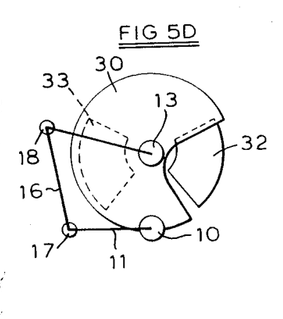

As illustrated in FIGS. 5A to 5H, as the input shaft 10 moves through 90° from the position illustrated in FIG. 5A, there is very little rotation of the output shaft 13 and disc 30 and the exhaust and inlet ports 32 and 33 remain closed as illustrated in FIG. 5B. After a further 90° rotation of shaft 10, the output shaft 13 is beginning to speed up and the exhaust port 32 is just beginning to open as shown in FIG. 5C. During the next full revolution of shaft 10 from the position illustrated in FIG. 5C to that illustrated in FIG. 5G, the output shaft 13 and disc 30 are driven relatively rapidly to open exhaust port 32 and inlet port 33 in turn. From the position illustrated in FIG. 5G, the valve rotor 30 begins to slow down and the inlet port 33 is closed by the time the input shaft 10 reaches the position illustrated in FIG. 5H. The shaft 13 and valve disc 30 are only rotated by a small amount as the input shaft rotates by 90° from the position illustrated in FIG. 5H back to the position illustrated in FIG. 5A.

Figure 5E:
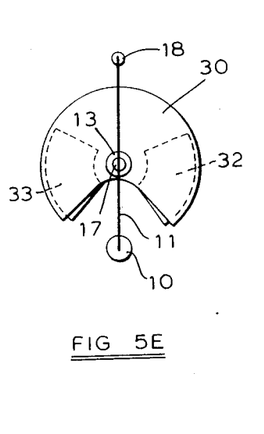
Figure 5F:
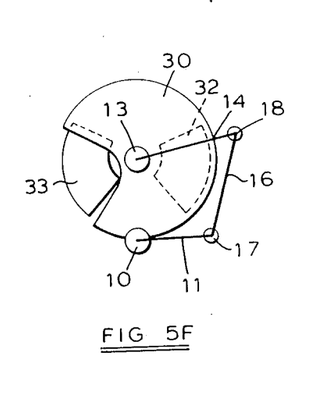
Figure 5G:
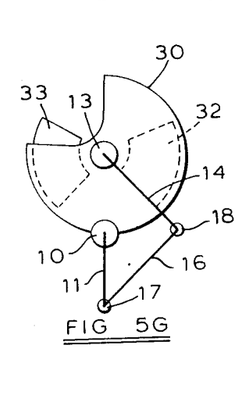

As shown in FIGS. 5A to 5H, approximately 75% of rotation of the valve disc 30 occurs while the input shaft 10 is rotating through one revolution, from the position illustrated in FIG. 5C to that illustrated in FIG. 5G. The exhaust and inlet ports 32 and 33 remain closed for over 180° of a revolution of the input shaft 10, from the position illustrated in FIG. 5H to that illustrated in FIG. 5B.

Figure 5H:
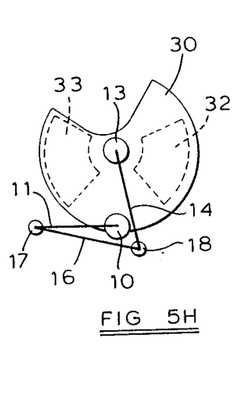

During the period for which the exhaust port 32 and inlet port 33 are closed, even though the input shaft 10 is driven at a constant speed, the valve rotor 30 will only be rotating slowly. This portion of the cycle, is timed to occur during the high pressure strokes, that is the compression and combustion strokes of the engine. During this period, the disc 30 is allowed to engage a seating area on the cylinder head 31 to provide a tight seal. Also in this portion of the cycle, the segment 33 exposes the ignition device 36 to the fuel/air mixture in the combustion chamber, so that ignition can take place.

Means may be included in the drive mechanism, for example a helical drive element, which will lift the valve disc 30 away from the seating area of cylinder head 31 as the valve disc 30 is accelerated by the drive mechanism, and allows the valve disc 30 to move down into engagement with the seating area, as the valve disc 30 is decelerated by the drive mechanism. This helical drive element could be a multi-start thread between the output shaft 13 and disc 30.

While the above embodiment provides a dwell period in which the drive to the valve rotor 30 is substantially reduced and the exhaust and inlet ports 32 and 33 remain shut, of approximately 180°, this dwell period may be adjusted by adjusting the relative lengths of the crank 11 and the crank 13 and link 16, to suit the requirements of the engine.

In multi-cylinder engines, each cylinder will have a rotary valve with a rotary drive of the form disclosed above. The input shafts 10 of the rotary drives will all be parallel to one another. These input shafts 10 may be connected to a common drive from the crank shaft of the engine, each drive being connected in appropriate phased relationship with the crank shaft.

According to one embodiment, a common input shaft driven by suitable means from the crank shaft may be arranged transverse to the input shafts 10, in similar manner to the overhead cam shaft of a conventional engine with poppet-type valves. Drive may then be transmitted from the common shaft by suitable means, for example bevel gears, which will transmit the drive through 90°.

Figure 6:
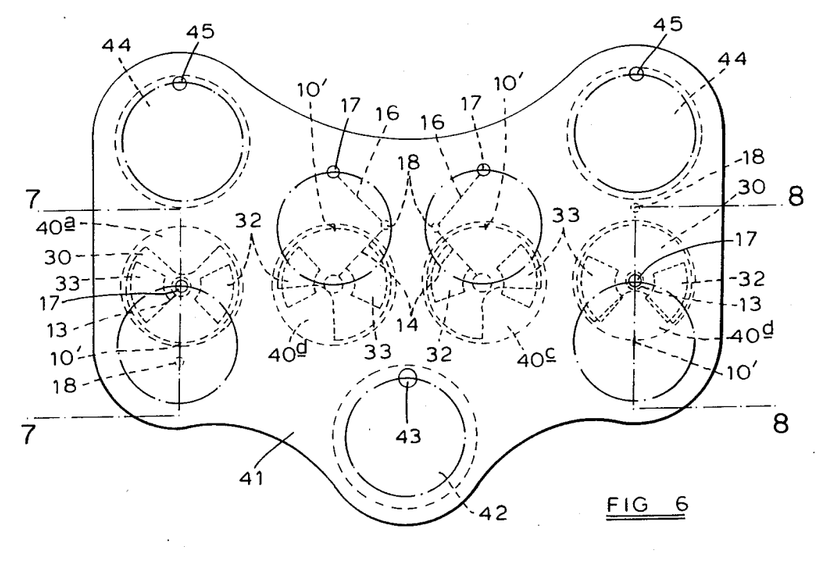
FIG. 6 illustrates in plan view a multi-cylinder engine utilizing drive mechanisms of the form illustrated in FIG. 1.

In an alternative embodiment, as illustrated in FIG. 6, the cranks 11 of all the rotary drives for rotary valves 30 serving cylinders 40a to 40d are defined by a common plate 41.

The plate 41 is drivingly connected to the engine crank shaft by means of a input shaft 42 which is parallel to the axis of rotation of the rotary valves 30. An eccentric crank 43 on the input shaft 42 engages the plate 41 to drive it in orbital manner. A pair of idler shafts 44 with cranks 45 of the same eccentricity as the input shaft crank 43, are provided at opposite corners of the plate 41 to stabilize the orbital motion thereof. The eccentricity of the cranks 43 and 45 is equal to the length L1 of the cranks 11, so that during orbital motion of the plate 41, any point thereon will describe a circle of diameter L1 equal to the circular path described by the crank pivot 17 as the rotary drive described above rotates the rotary valve 30.

A series of drive holes are provided in the plate 41, in which the crank pins 17 of the rotary drives associated with the different cylinders 40a to 40d, may be engaged. Alternatively, the crank pins 17 may be provided on the plate 41. The crank pins 17 pivotively connect links 16 to the plate 41, the links 16 being pivotively connected to cranks 14 associated with output shafts 13, in the manner described above.

As the plate 41 is driven to prescribe an orbital motion, the crank pins 17 will be driven about circular paths (shown in broken line in FIG. 6) of diameter L1 with a centre 10' which is equivalent to he axis of rotation of input shaft 10 of the rotary drive described with reference to FIGS. 1 to 5. The crank pins 17 will thus drive link 16, crank 14 and the output shaft 13 in the manner described above.

With the engine configuration described above, the firing order would typically be 40a; 40c; 40d; 40b and the phased relationship between the cylinders 40a to 40d would be 0°; 90°; 270°; 180°. In order to achieve appropriate phase relationship between the rotary valves 30, the valve ports 32 and 33, rotary valves 30 and rotary drives for cylinders 40b and 40c are disposed at 180° relative to those of cylinders 40a and 40d; the position of the drive holes 47 on plate 41 being altered correspondingly, so that while the circular paths of each drive hole passes through the axis of the associated input shaft 13, the circular path described by those drive holes associated with cylinders 40a and 40d on the opposite side of said axes from the circular paths described by the drive holes are associated with cylinders 40b and 40c. The rotary drives associated with the cylinders 40a and 40b are then connected to the plate 41 by engagement of the crank pin 17 in drive hole, so that they are one rotation (360°) out of phase with the rotary drives associated with cylinders 40d and 40c respectively.

In this manner, as illustrated in FIG. 6, when the cylinder 40a is just about to fire, the rotary drive will be in the position illustrated in FIG. 5A, both ports 32 and 33 being closed by rotary valve 30; cylinder 40b will be beginning its exhaust stroke, its rotary drive being in the position illustrated in FIG. 5C with exhaust port 32 just opening; cylinder 40c will be beginning its compression stroke, its rotary drive being in the position illustrated in FIG. 5G with inlet port 33 about to close; and cylinder 40d will be beginning its induction stroke, its rotary drive being in the position illustrated in FIG. 5E, the exhaust port 32 just closing and inlet port 33 just opening.

Figure 7:
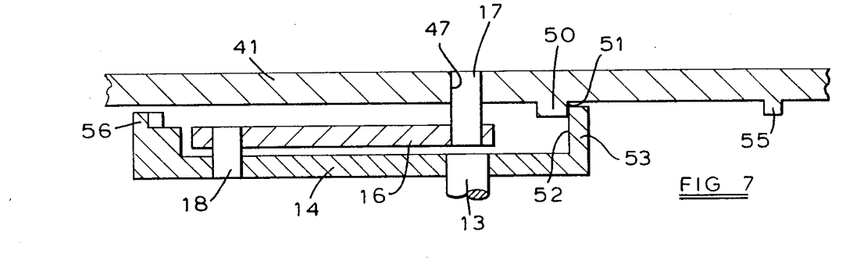
FIG. 7 is section along the line 7—7 in FIG. 6.
Figure 8:
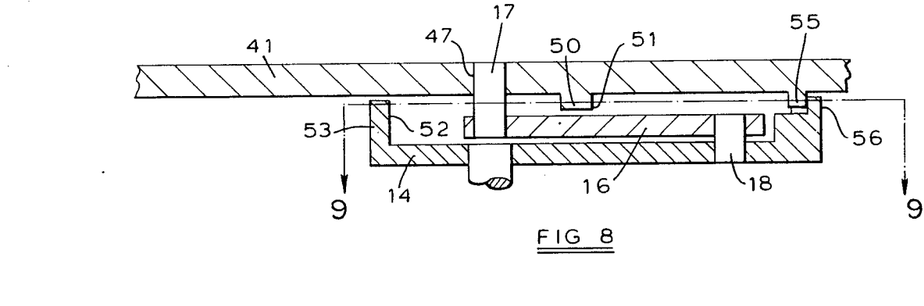
FIG. 8 is a section along the line 8—8 in FIG. 6.
Figure 9:
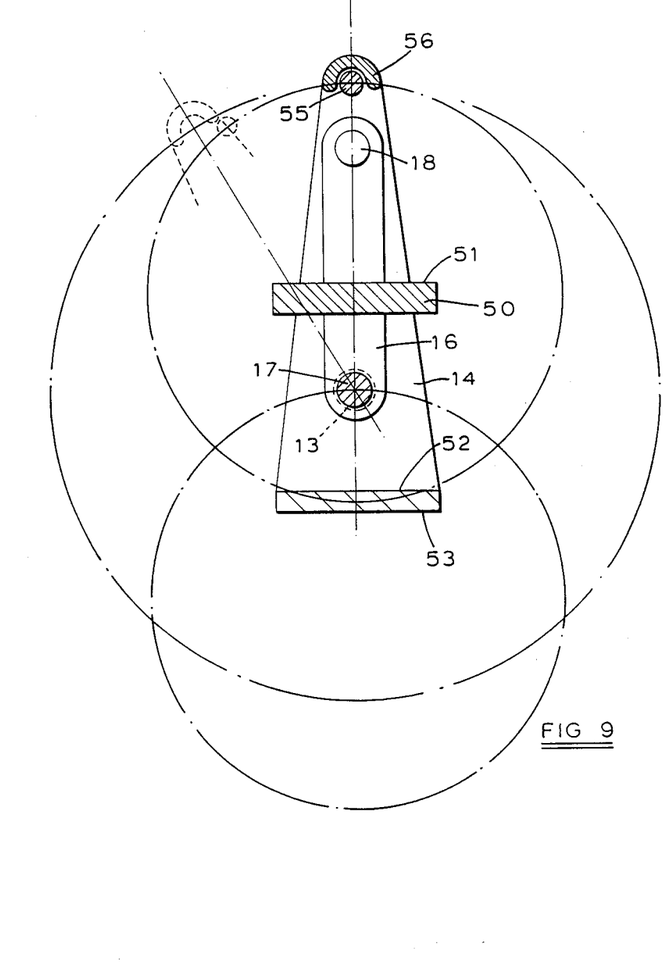
FIG. 9 is a section along the line 9—9 in FIG. 8.

FIGS. 7 to 9 illustrate an alternative interlock arrangement, which may be used in the embodiment illustrated in FIG. 6, to prevent crank 14 and link 16 pivoting about the axes of output shaft 13 and crank pin 17, when these are aligned as in the positions illustrated in FIG. 6 for cylinders 40a and 40d.

With this interlock arrangement, for each rotary drive, a first formation 50 is provided on the side of plate 41 adjacent the rotary drive, this formation 50 defining a flat face 51 which will engage the flat face 52 of a flange formation 53 on the end of crank 14 adjacent output shaft 13, when the rotary drive is in the position illustrated for cylinder 40a.

A pin formation 55 is also provided on the side of plate 41 adjacent the rotary drive. A cup formation 56 is provided at the end of crank 14 adjacent crank pin 18, the pin formation 55 being positioned on the plate 41 and the cup formation 56 being contoured such that as the crank 14 moves relative to the plate 41, the pin formation will move into and out of engagement with the cup formation 56, so that when the rotary drive is in the position illustrated for cylinder 4d, the pin formation 55 will be engaged within the cup formation 56.

Various modifications may be made without departing from the invention. For example, while the drive mechanism is particularly suitable for driving rotary valves, it may be used to drive other elements where a variation in the speed throughout the rotation of the element is required. Although the valve rotor described above is in the form of a disc with a single aperture, discs, cones or cylinders with one or more apertures, or rotors having vanes which extend radially to sweep one or more ports may be used. Rotary valves of the type disclosed may also be used to control flow to any number of ports.

While in the embodiment illustrated in FIG. 6 the orbiting plate 41 is stabilised by means of idler shafts 44, other means may be used for this purpose, for example the plate may be linked to a support member by means of an Oldham coupling. When used with valve gear, the rotary drive mechanism will give the required 2:1 drive ratio, the drive connection from, for example the crank shaft, should consequently be direct. However if other drive ratios are required this may be achieved by varying the ratio of drive from the crank. For example, in the embodiment illustrated in FIG. 6, the shaft 42 may drive plate 41 in orbital manner via an eccentric gear arrangement which will provide the necessary variation in drive ratio.

I claim:

1. A rotary drive mechanism comprising an input shaft having a first crank, an output shaft mounted parallel to the input shaft but offset radially therefrom by a distance equal to the length of the first crank, said output shaft having a second crank the length of which is greater than the length of said first crank, the first and second cranks being pivotally connected to opposite ends of a link, the link being the same length as the second crank, and interlock means act between the first crank and at least one of the second crank and link, to prevent rotation of the second crank and link independently of the input shaft, when the second crank and link are parallel to one another.

2. A rotary drive mechanism according to claim 1 in which the input shaft makes two revolutions for one revolution of the output shaft, up to 95% of a revolution of the output shaft corresponding to one revolution of the input shaft.

3. A rotary drive mechanism according to claim 1 in which the interlock mechanism comprises a formation associated with the first crank and a formation associated with at least one of the second crank and link, said formations engaging one another when the second crank and link are parallel to one another and the axis of the pivotal connection between the first crank and link coincides with the axis of the output shaft, engagement of the formations preventing rotation of the second crank and link about their coincident axes.

4. A rotary drive mechanism according to claim 3 in which the formation associated with the first crank engages one formation on one of the second crank and link, when the link and the second crank are parallel to one another on one rotation of the input shaft and engages a second formation on one of the second crank and link when the link and second crank are parallel to one another on the next rotation of the input shaft.

5. A rotary drive mechanism according to claim 4 in which the formation associated with the first crank defines a flat face which engages a contoured face on a first formation on the second crank, when the second crank and link are parallel to one another and are directed from the axis of the output shaft towards the input shaft, the contoured face being displaced from the axis of the output shaft towards the input shaft and the flat face being positioned between the contoured face and the axis of the output shaft.

6. A rotary drive mechanism according to claim 4 in which the formation associated with the first crank defines a flat face which engages a flat face on a second formation on the second crank, when said second crank and link are parallel to one another and directed from the axis of the output shaft away from the input shaft.

7. An assembly including a plurality of rotary drive mechanisms each drive mechanism having a first crank driven by a common input shaft an output shaft mounted parallel to the input shaft and having a second crank the length of the second crank being greater than the length of the first crank, the first and second cranks of each drive mechanism being pivotally connected to opposite ends of a link, the link being the same length as the second crank, and interlock means being provided between the first crank and at least one of the second crank and link of each drive mechanism to prevent rotation of the second crank and link independently of the input shaft, when the second crank and link are parallel to one another.

8. An assembly according to claim 7 in which one rotary drive is connected to the common input shaft in different phase relationship to another rotary drive.

9. An assembly according to claim 7 in which the first crank of each of the rotary drives are defined by a common plate which is constrained to be driven in orbital motion by the input shaft, the plate being pivotally connected to the link of each of the rotary drives.

10. An assembly according to claim 9 in which formations are provided on the plate for engagement of corresponding formations on the second crank of each rotary drive to provide said interlock means.

11. An assembly according to claim 10 in which a first formation on the plate defines a flat face which engages a flat face on a flange formation on the second crank, to provide an interlock in one position.

12. An assembly according to claim 10 in which a pin formation on the plate engages a cup formation on the second crank, to provide an interlock in a second position.

13. A rotary valve assembly comprising a drive mechanism having an input shaft having a first crank, an output shaft mounted parallel to the input shaft but offset radially therefrom by a distance equal to the length of the first crank, said output shaft having a second crank the length of which is greater than the length of said first crank, the first and second cranks being pivotally connected to opposite ends of a link, the link being the same length as the second crank, and interlock means being provided between the first crank and at least one of the second crank and link, to prevent rotation of the second crank and link independently of the input shaft, when the second crank and link are parallel to one another, said output shaft being drivingly connected to a valve rotor so that the valve rotor may be driven in intermittent manner, to open and close a port defined by the valve assembly, the intermittent drive being synchronised with the opening and closing of the port.

14. A rotary valve assembly comprising a plurality of drive mechanisms each drive mechanism having a first crank driven by a common input shaft an output shaft mounted parallel to the input shaft and having a second crank the length of the second crank being greater than the length of the first crank, the first and second cranks of each drive mechanism being pivotally connected to opposite ends of a link, the link being the same length as the second crank, and interlock means being provided between the first crank and at least one of the second crank and link of each drive mechanism to prevent rotation of the second crank and link independently of the input shaft, when the second crank and link are parallel to one another, the output shaft of each drive mechanism being drivingly connected to a valve rotor so that the valve rotor may be driven in intermittent manner to open and close a port defined by the valve assembly, the intermittent drive being synchronised with the opening and closing of the port.

* * * * *